United States Patent [19]

Dionne

[11] Patent Number: 4,863,591
[45] Date of Patent: Sep. 5, 1989

[54] INLINE FILTER

[76] Inventor: Earl G. Dionne, P.O. Box 35, Kellogg, Id. 83837

[21] Appl. No.: 221,267

[22] Filed: Jul. 19, 1988.

[51] Int. Cl.$^4$ .............................................. B01D 25/02
[52] U.S. Cl. .................................... 210/94; 210/108; 210/282; 210/445; 210/455
[58] Field of Search .................... 210/94, 95, 108, 282, 210/287, 445, 446, 447, 455, 483, 497.01, 500.25, DIG. 17

[56] References Cited

U.S. PATENT DOCUMENTS

| | | | |
|---|---|---|---|
| 194,016 | 8/1877 | Tittle et al. | 210/445 |
| 2,256,145 | 9/1941 | Hock | 210/445 |
| 3,085,689 | 4/1963 | Hering et al. | 210/445 |
| 3,574,509 | 4/1971 | Zentis et al. | 210/108 |
| 3,681,562 | 8/1972 | Winzen | 210/94 |
| 3,732,985 | 5/1973 | Murrell | 210/446 |
| 3,788,484 | 1/1974 | Godin | 210/447 |
| 3,794,180 | 2/1974 | Blocker | 210/445 |
| 3,872,576 | 3/1975 | Mott | 210/445 |
| 4,062,781 | 12/1977 | Strauss et al. | 210/455 |
| 4,263,140 | 4/1981 | Wujnovich et al. | 210/445 |

Primary Examiner—Frank Spear
Assistant Examiner—Joseph Drodge
Attorney, Agent, or Firm—Walter F. Wessendorf, Jr.

[57] ABSTRACT

An inline filter comprises transparent upstream and downstream halves defining truncated hollow right-circular cones whose flanged lower bases sandwich therebetween a concentric brass filter screen fixedly carried by the flanged lower bases joined together by heat-sealing. The upstream and downstream halves have respective male fittings for connection to respective upstream and downstream female couplings on an incoming water supply line for flow of such incoming water through the inline filter. The filter screen, which has an effective filtering capacity, area-wise, of almost 13 times the area of the internal diameter of the upstream male fitting, filters out and traps sand, dirt, particles and other debris carried by the incoming water. The transparent halves provide visual indication whether the filter screen is clogging up. Connecting the upstream female coupling to the downstream male fitting effects backflushing water flow to clean the filter screen.

3 Claims, 1 Drawing Sheet

INLINE FILTER

BACKGROUND OF THE INVENTION

1. Technical Field

This invention relates to an inline filter, mounted and disposed inline with respect to an incoming water supply line for a washing machine or lawn sprinkler, to filter out sand, dirt, particles and other debris from water flowing through the supply line.

2. Background

The problem in the art to which this invention apertains is the need for an inline filter for use with a washing machine or lawn sprinkler to filter out sand, dirt, particles and other debris from an incoming water supply line. A washing machine has solenoid-controlled water valves that control the hot and cold incoming water supply lines that are connected to the washing machine. A grain of sand caugth between a water valve and its valve seat in a washing machine is sufficient to prevent the water valve from fully seating with consequent water leakage. Likewise, sand, dirt, particles or other debris in an incoming water supply line connected to an oscillating lawn sprinkler will build-up to clog the small holes or orifices of such lawn sprinkler with consequent malfunctioning.

SUMMARY OF THE INVENTION

Accordingly, the object of the invention is to contribute to the solution of the discussed problem of the art by providing a transparent inline filter that can be disposed and connected as part of the water supply line to filter out sand, dirt, particles and other debris from water flowing through the incoming water supply line, by means of an appropriate brass filter screen. By simple reverse connection of the water supply line's upstream female coupling with the inline filter's downstream male fitting, the water thereby flowing in the opposite direction through the inline filter and out the inline filter's disconnected upstream male fitting will backflush and clean the brass filter screen.

BRIEF DESCRIPTION OF THE DRAWINGS

This object and other objects of the invention should be discerned and appreciated from the Description of the Preferred Embodiment and the Operational Description, taken in conjunction with the drawings, wherein like reference numerals refer to similar parts throughout the several views, in which.

DESCRIPTION OF THE PREFERRED EMBODIMENT

Figure 1:
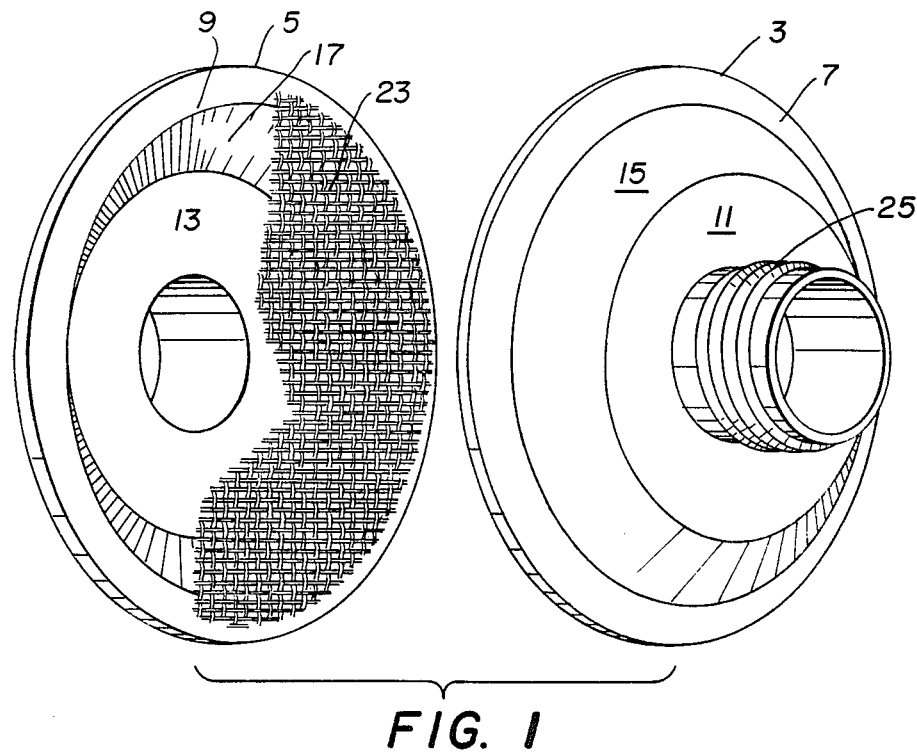
FIG. 1 is a blown-up assembly view, in perspective, of the inline filter.
Figure 2:
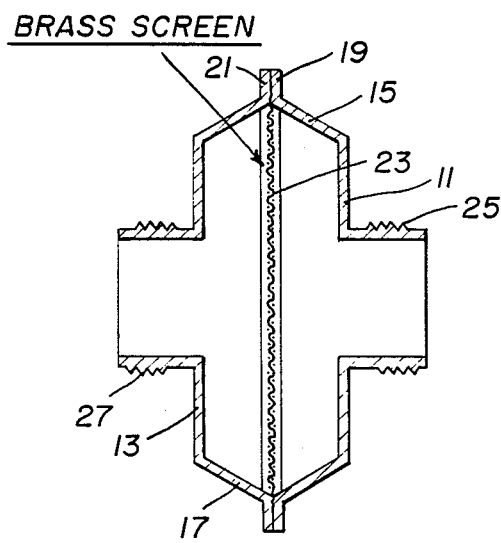
FIG. 2 is a sectional view of the inline filter.

In FIG. 1 of the drawings, reference numeral 1 generally refers to the invention of the inline filter. Filter 1 comprises two similarly configured halves 3 and 5 of suitable transparent plastic material. For purposes of explanation, half 3 is arbitrarily referred to as the upstream half and the other half 5 is arbitrarily referred to as the downstream half. In configuration, the halves 3 and 5 define two truncated hollow right-circular cones, each being of integral, one-piece construction. The halves 3 and 5 have respective lower bases 7 and 9, upper bases 11 and 13, and lateral walls 15 and 17 sloped at an angle of approximately 29°. The lower bases 7 and 9 are laterally extended to define respective flanges 19 and 21. Flanges 19 and 21 sandwich therebetween a concentric 60 mesh brass filter screen 23 whose diameter is about $\frac{1}{8}$" less than the diameters of the flanges 19 and 21. Flanges 19 and 21, together with the centered filter screen 23, are joined together by appropriate heat-sealing of flanges 19 and 21, or by the flanges being appropriately glued together. The upper bases 11 and 13 have respective upstream and downstream male fittings 25 and 27.

OPERATIONAL DESCRIPTION

Inline filter 1 is disposed and connected inline as part of the incoming water supply line (not shown) by such conventional water supply line's upstream female coupling being connected to the upstream male fitting 25 and the downstream female coupling being connected to the downstream male fitting 27. Brass screen 23 will filter out and trap in the upstream half 3 sand, dirt, particles and other debris carried by water flowing through the supply line. The brass filter screen 23 has an effective filtering diameter of about 2-$\frac{1}{4}$" and the internal diameter of the upstream male fitting is about $\frac{5}{8}$". The brass filter screen's effective diameter is over 3-$\frac{1}{2}$ times greater than the upstream male fitting's internal diameter; and the filter screen 23 has a filtering capacity, areawise, of almost 13 times a conventional $\frac{5}{8}$" diameter filter screen which would otherwise be inserted within the incoming water line. This means that when such conventional filter screen is clogged from filtering out sand, dirt, particles and other debris from an incoming water supply line, the inline filter 1 of this invention can continue its filtering action almost 13 times longer before it becomes clogged. Another problem encountered when a conventional filter screen is inserted within the incoming water line is the fact that cleaning such conventional filter screen requires a time-consuming and complicated procedure of disassembly of the incoming water supply line, removal and cleaning of such conventional filter scren and reassembly. Inasmuch as the inline filter 1 is transparent, periodic inspection will reveal whether the brass filter screen 23 is becoming clogged. Cleaning screen 23 is simple and quick. To clean screen 23, the upstream and downstream female couplings are disconnected from their respective male fittings 25 and 27. Then the upstream female coupling is reverse connected to the downstream male fitting 27 to backflush and clean filter screen 23. Then the upstream and downstream female couplings are reconnected to their respective male fittings 25 and 27.

I claim:

1. An inline filter for use with an incoming water supply line, said incoming water supply line having upstream and downstream female threaded couplings, said inline filter being constructed and arranged to filter out and trap sand, dirt, particles and other debris carried by the incoming water of said incoming water supply line, said inline filter being constructed and arranged to continuously indicate whether said inline filter is becoming clogged from trapped sand, dirt, particles and other debris, and said inline filter and water supply line providing means for back-flushing; said inline filter having identical upstream and downstream transparent halves and a filter screen, said transparent halves defining truncated hollow right-circular cones, said right-circular cones having flanged lower bases, said flanged lower bases of said transparent halves fixedly sandwiching therebetween said filter screen to define one-piece construction, said upstream and downstream halves having respective upstream and downstream male threaded fittings, said upstream and downstream male threaded fittings being connected with said respective upstream and downstream female threaded couplings of said incoming water supply line, said filter screen filtering out and trapping in said upstream transparent half of said inline filter the sand, dirt, particles and other debris from the incoming water and thereby continuously indicating whether said inline filter is becoming clogged from the sand, dirt, particles and other debris filtered-out and trapped in said upstream transparent half of said inline filter, and said inline filter and water supply line defining said means for back-flushing by said downstream male threaded fitting of said downstream transparent half of said inline filter being connected to said upstream female threaded coupling of said water supply line.

2. An inline filter in accordance with claim 1, wherein said upstream male threaded fitting of said upstream half of said inline filter has an internal diameter, wherein said filter screen has a filtering surface of over $3\frac{1}{2}$ times the area defined by said internal diameter of said upstream male threaded fitting of said upstream half of said inline filter.

3. An inline filter in accordance with claim 1, wherein said filter screen is of 60 mesh brass material.

* * * * *